United States Patent Office 2,937,156
Patented May 17, 1960

2,937,156

COLLOIDAL DISPERSIONS OF POLYTETRA-FLUOROETHYLENE IN CERTAIN ALCOHOLS, ETHERS, OR AMINES AND PROCESS FOR PREPARING SAME

Kenneth Lester Berry, Hockessin, Del., assignor to E. I. du Pont de Nemours and Company, Wilmington, Del., a corporation of Delaware No Drawing. Application December 22, 1954
Serial No. 477,117

7 Claims. (Cl. 260—29.6)

This invention relates to the preparation of colloidal dispersions of polytetrafluoroethylene, and more particularly, it relates to the preparation of stable, fluid, colloidal dispersions of polytetrafluoroethylene wherein the continuous phase is primarily an organic liquid.

This is a continuation-in-part of copending patent application Serial No. 281,915, filed by K. L. Berry on April 11, 1952, now abandoned.

Polytetrafluoroethylene is a material of many uses because of its property of being inert to the action of many forces, such as electricity, heat, and chemicals. Although its inertness is advantageous, this property causes difficulty when polytetrafluoroethylene is subjected to fabrication methods. It is therefore desirable that methods be discovered for preparing polytetrafluoroethylene in media from which polytetrafluoroethylene may be fabricated into various coatings, films, and other articles of manufacture.

U.S. Patents 2,478,229 and 2,559,752 disclosed and claim methods of polymerizing tetrafluoroethylene to obtain aqueous, colloidal dispersions of polymeric tetrafluoroethylene. Dispersions, produced by the above-mentioned two patents, are widely useful in the preparation of coatings and films of polytetrafluoroethylene. However, there are many useful applications to which colloidal dispersions of polytetrafluoroethylene may be put, wherein the presence of a substantial amount of water may be either harmful or not desirable. For example, in the coating of paper with polytetrafluoroethylene by using an aqueous dispersion of the polymer, the presence of a substantial portion of water may materially decrease the inherent strength of the paper.

Films and coatings are often formed by spreading a dispersion of a film-forming polymer on a substrate, removing the continuous phase by heat or evaporation, and depositing the polymer on the substrate as a film or coating. If an aqueous dispersion of polytetrafluoroethylene is used to form films or coatings by the method just described, the polymer may coagulate before complete evaporation of the water is accomplished. In some applications, polymer coagulation is acceptable or even desirable, while in other applications the coagulation of the polymer is not desirable.

It is an object of this invention to provide stable, fluid, colloidal dispersions of polytetrafluoroethylene in which the continuous phase is a selected organic liquid. It is also an object of this invention to prepare colloidal dispersions of polytetrafluoroethylene in which the polymer particles retain their colloidal size and do not coagulate into large flocculent particles during the process of forming a film or a coating of the polymer. Colloidal size is herein meant to be a size in the order of from about 0.02 to about 1.0 micron. Other objects will appear in the description of the invention given hereinafter.

The above objects are accomplished by dispersions comprising (1) a dispersed phase of polytetrafluoroethylene and (2) a continuous phase containing a selected organic liquid as the major portion, water as the minor portion, and a small amount of a dispersing agent. These dispersions are prepared by transferring colloidal polytetrafluoroethylene particles from an aqueous continuous phase to an organic continuous phase as more fully described hereinafter. More particularly, there is added to the aqueous colloidal dispersion of polymer, a small amount of a dispersing agent and an amount of a selected nonionic, water-miscible organic liquid which will form the continuous phase in the final product. This organic liquid is selected from the group consisting of ethylene glycol, diethylene glycol, glycerol, ethanolamine, glycerol-alpha-monoethyl ether, diethanolamine, triethanolamine, glycerol-alpha-monochlorhydrin, monacetin, diethylene glycol monobutyl ether, diethylene glycol monoethyl ether, and diethylene triamine. By evaporation of the water from the mixture of the aqueous dispersion, the dispersing agent, and the organic liquid, a colloidal dispersion of polymeric particles in the organic liquid can be prepared. The starting material, in the process of this invention, is a stable, aqueous, colloidal dispersion of polymeric tetrafluoroethylene, such as may be prepared by the processes of the aforementioned U.S. Patents 2,478,229 and 2,559,752.

Both the aqueous dispersion used as a starting material in this invention and the organic liquid dispersion product are referred to as being "stable" to indicate that the dispersions undergo no substantial change in properties with the passage of time. The dispersed phase may settle after a period of immobility, but the original dispersed condition can be regained by rotating the container or otherwise agitating the fluid. Under certain circumstances, the dispersed phase, which has been allowed to settle and stand without any agitation for many months, may not again form a dispersion by merely agitating the fluid. However, for all practical purposes, the dispersions described in this process can be reasonably defined as being stable, in that the slow settling of the solids does not unalterably change the properties of the dispersion.

In the preferred embodiment of this invention, an aqueous colloidal dispersion of polytetrafluoroethylene containing 40% to 60% by weight of polymer is mixed with a substantially equal volume of a polyhydroxy alcohol, such as ethylene glycol or glycerol, and about 10%, based on the weight of polytetrafluoroethylene, of polyethylene glycol mono-p-octylphenyl ether, as a dispersing agent. Water is then evaporated from the mixture described above. A particularly effective method of evaporating the water from the mixture prepared as described above, is to form a falling film of the mixture on the walls of a partially evacuated chamber which is maintained at a temperature from about 60° C. to about 70° C. Evporation of water is continued until approximately 10% by weight of water remains in the mixture. By means of the method just described, a stable, fluid, colloidal dispersion of polytetrafluoroethylene can be prepared, in which the continuous phase is the polyhydroxy alcohol containing a minor proportion of water.

Films may be prepared from the organic liquid dispersion produced by the above-described process, by spreading the dispersion on a suitable surface, drying the dispersion, thus causing the polymeric particles to be deposited upon the film-forming surface, and thereafter, sintering the deposited particles at a temperature from about 327° C. to about 400° C. to form a tough homogeneous film of polytetrafluoroethylene. Similarly, paper or textiles may be coated with polytetrafluoroethylene by dipping the paper or textile material in the dispersion prepared by this process, drying, and sintering to form a tough, homogeneous coating of polytetrafluoroethylene.

The invention is illustrated in greater detail by the following examples. Unless otherwise designated, parts and percentages are by weight in the following examples and elsewhere in this description of the invention.

*Example 1.*—Sixty milliliters of an aqueous colloidal dispersion of polytetrafluoroethylene, containing 58% of solid polymeric particles were mixed with 50 milliliters of anhydrous ethylene glycol containing 10.9% based on the polytetrafluoroethylene present, of polyethylene glycol mono-p-octylphenyl ether. This mixture, in the form of a thin film, was caused to flow down the inside surface of an evacuated tube, said tube being approximately one-half inch in inside diameter and approximately 20 inches long, surrounded by a water jacket maintained at 60° C. The absolute pressure inside the evacuated tube varied from about 15 mm. to about 20 mm. of mercury. The evaporation was effected by passing the mixture through the tube twice. The resultant mixture was a fluid, colloidal dispersion of polytetrafluoroethylene containing 41% of solids and 10.6% of water. Thin asbestos sheeting, dipped into the said resultant mixture, followed by drying, and then sintering at 400° C. for 20 minutes, was covered with a thin adherent coating of polytetrafluoroethylene.

*Example 2.*—Thirteen parts of an aqueous colloidal dispersion of polytetrafluoroethylene, containing 3% polymeric solids were mixed with 0.6 part of ethylene glycol and 10% of polyethylene glycol mono-p-octylphenyl ether, based on the polytetrafluoroethylene present. The mixture was concentrated by gently boiling off most, but not quite all, of the water. The resultant dispersion contained approximately 40% polymeric solids in a liquid medium composed primarily of ethylene glycol. The said resultant dispersion was spread upon a metal surface, heated rapidly at 327° C. to 400° C. to evaporate the liquid phase and to coalesce the polymer particles. A film of polytetrafluoroethylene .002 inch thick was obtained.

*Example 3.*—Fifty milliliters of an aqueous colloidal dispersion of polytetrafluoroethylene, containing 51% polymer were mixed with 50 milliliters of ethylene glycol. As a dispersing agent, there was added 5.6%, based on the polytetrafluoroethylene present, of polyethylene glycol mono-p-octylphenyl ether. The mixture of aqueous dispersion, ethylene glycol, and dispersing agent was passed, in the form of a falling film, through the evacuated tube, described in Example 1, at approximately 15 mm. of mercury absolute pressure and 60° C. After two complete passes through the tube, the water content of the total dispersion was 7.1%, and after three passes through the tube, the water content was 6.2%. The polytetrafluoroethylene content was 36% after the third pass through the evaporator.

*Example 4.*—To 500 ml. of an aqueous dispersion containing 450 grams of polytetrafluoroethylene and 6% by weight of a polyethylene glycol mono-p-octylphenyl ether (based on the weight of polytetrafluoroethylene) was added 158 grams of a 40/60 mixture of glycerol/ethylene glycol. The mixture was stirred at 50° C. under partial vacuum until there was formed a colloidal dispersion containing 62% polytetrafluoroethylene by weight.

*Example 5.*—Diethylene glycol was substituted for the glycerol/glycol mixture of Example 4. The final dispersion contained 69% polytetrafluoroethylene, with the remainder chiefly diethylene glycol and a minor amount of water.

*Example 6.*—To an aqueous dispersion containing 60% by weight of polytetrafluoroethylene and 6% by weight of polyethylene glycol mono-p-octylphenyl ether (based on the polytetrafluoroethylene) was added sufficient glycerol to give a polytetrafluoroethylene/glycerol ratio of 74:26. The dispersion was cast on a glass plate and water allowed to evaporate at room temperature. A stiff paste was obtained when sufficient water had evaporated to reduce its concentration to less than 5% by weight.

*Example 7.*—The process of Example 6 was repeated, except that ethanolamine was substituted for glycerol. Water was removed by heating this composition to 50° C. and stirring slowly under reduced pressure. The final dispersion contained 65% polytetrafluoroethylene.

*Example 8.*—Five ml. of the polytetrafluoroethylene dispersion of Example 6 was placed in a beaker and 2 ml. of a 50/50 mixture of water and glycerol-alpha-monomethyl ether was added. A portion of this dispersion was cast onto a glass plate and water was evaporated until the dispersion had changed to a paste having a consistency such that it could be spread easily on a suitable substrate.

The same procedure as described in Example 8 was employed, and found to be successful, in testing the operability of each of the following compuonds as the continuous medium in place of glycerol-alpha-monomethyl ether:

Diethanolamine
Triethanolamine
Glycerol-alpha-monochlorohydrin
Monacetin
Diethylene glycol monobutyl ether
Diethylene glycol monoethyl ether
Diethylene triamine It has been found that a stable, fluid, colloidal dispersion of polytetrafluoroethylene in an organic liquid can be made by employing variations of the basic examples shown above. However, in all procedures, a limiting factor is that the final product must contain little or no coagulum. A small amount of coagulum may be removed by filtration, but it is preferable to use components and procedures which will result in substantially no coagulation, thus eliminating a filtration step.

The organic liquid forming the continuous phase of the polymeric dispersions of this invention has been defined above as any of groups of specifically named compounds. Certain other compounds, for example, ethylene glycol monoethyl ether, diethylene glycol diacetate, diethylene glycol diethyl ether, and ethyl lactate are not suitable as the continuous phase of the dispersions described herein, because the polymeric particles coagulated during the evaporation step, or for other reasons. A desirable group of the compounds employed as the continuous phase in the dispersions of this invention are hydroxyalkyl or aminoalkyl, the preferred compounds being the polyhydroxy alcohols, such as the glycols and glycerol. Many compounds which satisfy the definition given above, and which may therefore be utilized in the process of this invention, will be apparent to skilled chemists.

Dispersing agents which may be employed are, in general, non-ionic, surface-active compounds. The dispersing agent must be miscible with water and the organic liquid in the various proportions used to make up the continuous phase of the dispersions of this invention. Various polyethers particularly alkylphenyl monoethers of polyglycols, have been found to be useful dispersing agents. In addition to polyethylene glycol mono-p-octylphenyl ether, suitable dispersing agents include mono-, tri-, and pentaethylene glycol mono-p-octylphenyl ethers and the corresponding dodecylphenyl ethers. Another dispersing agent which may be employed in this invention is a reaction product of polyoxypropylene glycol and ethylene oxide.

It is to be noted that, by means of this invention, colloidal particles of polytetrafluoroethylene are transferred from an aqueous continuous phase, in the starting material, to an organic liquid continuous phase in the product. This transference is obtained by removal of water. However, the water removal must be accomplished within certain limits of temperature and certain limits of water concentration. If the temperature during the evaporation step is too high, coagulum may be formed. Likewise, if too much water is evaporated from the dispersion, coagulum is formed. In general, the temperature at which the evaporation of water takes place should not be appreciably higher than the boiling point of the mixture at the pressure employed in the process. Thus, at atmospheric pressure, the evaporation temperature should be substantially 100° C., while at pressures below 1 atmosphere, the evaporation temperature should be decreased to correspond to the boiling point of the dispersion at the pressure employed in the process.

The evaporation of water should be so conducted that some minor proportion of water, 3% to 20% by weight, remains in the dispersion produced by this invention. If all the water is removed by evaporation, complete coagulation may be effected. It has been found that, if approximately 3% by weight of water is present in the final product, there is no substantial amount of coagulum formed. The maximum amount of water does not appear to be critical in producing a stable, fluid, colloidal dispersion, since the aqueous dispersion used as a starting material in this invention is a stable, fluid, colloidal dispersion. However, the ultimate use of the product dispersion of this invention may dictate the maximum amount of water allowable. If the product is to be used to coat polytetrafluoroethylene on a material that is sensitive to water, low concentrations of water are desirable. On the other hand, in the production of films, as described in Example 2, the maximum water content does not appear to be critical. For many applications the preferred limits of water concentration in the final product of this invention have been found to be from about 3% to about 15% by weight of the total dispersion.

Relative proportions of organic liquid, dispersing agent, and aqueous dispersion of the polymer are selected in such a manner that the final product is free from coagulum, and also is fluid, whether it be a free-flowing liquid or a paste. The relative proportion of organic liquid employed in this invention may vary widely, although the stoichiometry of the process will dictate certain limits to be used in order to prepare a desired concentration of polymeric particles in the product. Thus, for example, if a low concentration, aqueous dispersion of polytetrafluoroethylene is mixed with a large amount of organic liquid, the product produced by removal of the water will still be a dilute dispersion of the polymer. It has been found, however, that, in general, the preferred limits of organic liquid concentration for most applications are from about 85% to about 20% by weight of the product dispersion.

The limits on the amount of aqueous dispersion used in this invention depend on the relative proportions of water and polytetrafluoroethylene in the aqueous dispersion used as a starting material. The concentration of polymer in the aqueous dispersion used as a starting material is not critical. Commercially available aqueous dispersions containing up to 60% polymeric solids may be employed in the process of this invention.

The dispersing agent is an important factor of this invention. In the absence of a dispersing agent, coagulum is immediately formed when a mixture of an organic liquid and an aqueous dispersion of polytetrafluoroethylene is heated in order to evaporate water. The relative proportion of dispersing agent employed in this invention appears to be dependent upon the relative proportion of polytetrafluoroethylene in the dispersion. It has been found that a minimum of about 3% of dispersing agent, based on the weight of the polymeric tetrafluoroethylene present, is necessary to prevent coagulation. The preferred amount of dispersing agent to be employed is from about 4% to about 15% by weight of polytetrafluoroethylene present. Higher percentages of the dispersing agent, for example, 20% or more, may be used without impairing the process of the invention, but the use of an excess of dispersing agent seems to result in no advantages over the use of the preferred limits.

The polymer concentration in the final dispersion may vary according to the relative amounts of the other ingredients used to make the dispersion. However, in general, it has been found that dispersions can be prepared having a polytetrafluoroethylene concentration of from about 3% to about 70% when employing the preferred amounts of organic liquid, dispersing agent, and aqueous dispersion of polytetrafluoroethylene.

Other variations of this invention may be apparent to those skilled in the art, and it is not intended that this invention be limited by the examples or discussion herein.

I claim:

1. A stable, fluid, colloidal dispersion consisting of (1) a dispersed phase in the amount of 3%–70% by weight of said dispersion and comprising polytetrafluoroethylene and (2) a liquid, continuous phase in the amount of 97%–30% by weight of said dispersion and consisting of (a) 3%–20% by weight of said dispersion of water, (b) a major amount of a member of the group consisting of ethylene glycol, diethylene glycol, glycerol, ethanolamine, glycerol-alpha-monoethyl ether, diethanolamine, triethanolamine, glycerol-alpha-monochlorohydrin, monacetin, diethylene glycol monobutyl ether, diethylene glycol monoethyl ether, and diethylene triamine, and (c) 3%–20% by weight of said polytetrafluoroethylene of an alkyl phenyl monoether of a polyglycol.

2. The process of preparing a stable, fluid, colloidal dispersion of polytetrafluoroethylene in an organic liquid which comprises (1) forming a mixture of ingredients consisting of (a) an aqueous, colloidal dispersion of polytetrafluoroethylene containing from about 1% to about 60% by weight of polytetrafluoroethylene, (b) a member of the group of organic liquids consisting of ethylene glycol, diethylene glycol, glycerol, ethanolamine, glycerol-alpha-monoethyl ether, diethanolamine, triethanolamine, glycerol-alpha-monochlorohydrin, monacetin, diethylene glycol monobutyl ether, diethylene glycol monoethyl ether, and diethylene triamine, and (c) an alkyl phenyl monoether of a polyglycol, and evaporating water from said mixture of ingredients until the continuous phase contains a major portion of organic liquid (b) and from 3%–20% by weight of said dispersion of water.

3. The process of claim 2 in which said monoether is polyethylene glycol mono-p-octylphenyl ether.

4. A stable, fluid, colloidal dispersion consisting of (1) a dispersed phase in the amount of 3%–70% by weight of said dispersion and comprising polytetrafluoroethylene and (2) a liquid continuous phase in the amount of 97%–30% by weight of said dispersion and consisting of (a) a minor amount, but not less than 3% by weight of said dispersion, of water; (b) 3%–20% by weight of said polytetrafluoroethylene of an alkylphenyl monoether of polyethylene glycol; and (c) a major amount of ethylene glycol.

5. A stable, fluid, colloidal dispersion consisting of (1) a dispersed phase in the amount of 3%–70% by weight of said dispersion and comprising polytetrafluoroethylene and (2) a liquid continuous phase in the amount of 97%–30% by weight of said dispersion and consisting of (a) a minor amount, but not less than 3% by weight of said dispersion, of water; (b) 3%–20% by weight of said polytetrafluoroethylene of an alkylphenyl monoether of polyethylene glycol; and (c) a major amount of glycerol.

6. A stable, fluid, colloidal dispersion consisting of (1) from about 10 to about 70 parts by weight of a dispersed phase comprising polytetrafluoroethylene and (2) from about 90 to about 30 parts by weight of a liquid continuous phase consisting of (a) from about 3 to about 15 percent of water, based on the weight of phases (1) plus (2), (b) from about 3 to about 20 percent of polyethylene glycol mono-p-octylphenyl ether, based on the weight of phase (1), and (c) from about 85 to about 20 percent of ethylene glycol, based on the weight of phases (1) plus (2).

7. A stable, fluid, colloidal dispersion consisting of (1) from about 10 to about 70 parts by weight of a dispersed phase comprising polytetrafluoroethylene and (2) from about 90 to about 30 parts by weight of a liquid continuous phase consisting of (a) from about 3 to about 15 percent of water, based on the weight of phases (1) plus (2); (b) from about 3 to about 20 percent of polyethylene glycol mono-p-octylphenyl ether, based on the weight of phase (1); and (c) from about 85 to about 20 percent of glycerol, based on the weight of phases (1) plus (2).

References Cited in the file of this patent

UNITED STATES PATENTS

| | | |
|---|---|---|
| 2,510,112 | Holbrook | June 6, 1950 |
| 2,581,454 | Sprung | Jan. 8, 1952 |
| 2,613,193 | Osdal | Oct. 7, 1952 |
| 2,775,569 | Dipner et al. | Dec. 25, 1956 |

FOREIGN PATENTS

| | | |
|---|---|---|
| 1,136,483 | France | Jan. 7, 1957 |
| 497,218 | Belgium | Nov. 16, 1950 |